US012280838B2

(12) United States Patent
Polmans et al.

(10) Patent No.: US 12,280,838 B2
(45) Date of Patent: Apr. 22, 2025

(54) MOTOR VEHICLE POWER STEERING SYSTEM

(71) Applicants: thyssenkrupp Presta AG, Eschen (LI); thyssenkrupp AG, Essen (DE)

(72) Inventors: Kristof Polmans, Tarrenz (AT); Imre Szepessy, Mauren (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 592 days.

(21) Appl. No.: 17/637,055

(22) PCT Filed: Aug. 20, 2020

(86) PCT No.: PCT/EP2020/073338
§ 371 (c)(1),
(2) Date: Feb. 21, 2022

(87) PCT Pub. No.: WO2021/032839
PCT Pub. Date: Feb. 25, 2021

(65) Prior Publication Data
US 2022/0297747 A1 Sep. 22, 2022

(30) Foreign Application Priority Data
Aug. 22, 2019 (DE) ...................... 10 2019 212 618.9

(51) Int. Cl.
*B62D 5/04* (2006.01)
*B62D 1/04* (2006.01)
*B62D 5/00* (2006.01)
(52) U.S. Cl.
CPC ......... *B62D 5/0481* (2013.01); *B62D 5/0421* (2013.01); *B62D 1/04* (2013.01); *B62D 5/001* (2013.01)

(58) Field of Classification Search
CPC .................................................... B62D 5/0481
See application file for complete search history.

(56) References Cited

U.S. PATENT DOCUMENTS 11,192,576 B2 * 12/2021 Ushiro ................. B62D 5/0481
12,030,482 B2 *  7/2024 Takeda ................. B60W 10/18
(Continued)

FOREIGN PATENT DOCUMENTS

CN  102730055 A  10/2012
CN  105313948 A   2/2016
(Continued)

OTHER PUBLICATIONS

English Translation of International Search Report Issued in PCT/EP2020/073338 dated Nov. 16, 2020.

*Primary Examiner* — Kevin Hurley
(74) *Attorney, Agent, or Firm* — thyssenkrupp North America, LLC

(57) ABSTRACT

A motor vehicle power steering system may include a steering handle having at least one handle sensor for detecting a handle position of the steering handle, an electronically controlled steering actuator having an electric motor for providing an actuating torque based on the detected handle position, a mechanical power transmission for transmitting the actuating torque to steered wheels, a position sensor for detecting a wheel position of the steered wheels, and a monitoring device that is configured to relate the wheel position detected by the position sensor to at least one input parameter of the mechanical power transmission given by the electric motor to monitor the functioning of the mechanical power transmission.

16 Claims, 4 Drawing Sheets

(56) References Cited

U.S. PATENT DOCUMENTS

| | | |
|---|---|---|
| 2002/0033301 A1 | 3/2002 | Clephas |
| 2005/0037884 A1 | 2/2005 | Hermann et al. |
| 2010/0305803 A1 | 12/2010 | Schusteritz |
| 2012/0006612 A1 | 1/2012 | Wilson-jones et al. |
| 2012/0253588 A1 | 10/2012 | Ghoneim |
| 2015/0166099 A1 | 6/2015 | Kim et al. |
| 2015/0375776 A1 | 12/2015 | Hong |
| 2017/0080972 A1 | 3/2017 | Kim et al. |
| 2018/0009472 A1 | 1/2018 | Sawada et al. |
| 2019/0047618 A1 | 2/2019 | Hultén |
| 2019/0210639 A1* | 7/2019 | Wang ............... B62D 5/0424 |
| 2021/0114651 A1* | 4/2021 | Wilson-Jones .... B62D 15/0225 |
| 2022/0242479 A1* | 8/2022 | Hong ................ B62D 5/0463 |
| 2024/0025474 A1* | 1/2024 | Takeda ............... B62D 15/021 |
| 2024/0343301 A1* | 10/2024 | Alaimo ............... B62D 5/0442 |

FOREIGN PATENT DOCUMENTS

| | | |
|---|---|---|
| CN | 105916748 A | 8/2016 |
| CN | 108602529 A1 | 9/2018 |
| DE | 100 19 152 A1 | 12/2000 |
| DE | 10 2009 026 497 A1 | 12/2010 |
| DE | 10 2018 100 515 A1 | 7/2019 |
| EP | 1 190 936 A1 | 3/2002 |
| EP | 3 254 932 A1 | 12/2017 |
| KR | 2017 0069717 A | 6/2017 |

\* cited by examiner

MOTOR VEHICLE POWER STEERING SYSTEM

CROSS REFERENCE TO RELATED APPLICATIONS

This application is a U.S. National Stage Entry of International Patent Application Serial Number PCT/EP2020/073338, filed Aug. 20, 2020, which claims priority to German Patent Application No. DE 10 2019 212 618.9, filed Aug. 22, 2019, the entire contents of both of which are incorporated herein by reference.

FIELD

The present disclosure generally relates to steering systems, including power steering systems for motor vehicles.

BACKGROUND

In motor vehicle power steering systems, a target steering angle of the steered wheels is specified via control interventions of the driver at a steering handle, for example a steering wheel, by the chosen handle position. This target steering angle is set at the steered wheels by means of a steering actuator. The actuating torque of the steering actuator is usually provided by an electric motor. For example, a rack can be so displaced by means of the steering actuator that the desired vehicle steering angle is achieved. In the case of a conventional electromechanical motor vehicle power steering system, there is a mechanical coupling between the steering handle and the actuating elements for adjusting the steered wheels, so that the steering actuator provides only an auxiliary steering force which supports the control interventions of the driver.

As a further development, motor vehicle power steering systems are known which are referred to as steer-by-wire steering systems and in which there is no longer a mechanical coupling between the steering handle and the steered wheels. In particular in steer-by-wire steering systems, high demands are made of the fail-safety of the electronic systems, since there is no mechanical fallback level by means of which the driver could take over the steering function in the event of failure of the steering system.

EP 1 190 936 A1 therefore discloses a steer-by-wire power steering system which allows a steering angle to be given by means of the steering handle even in the event of failure of at least one electrical component, in particular of one or all of the angle sensors for determining the position of the steering handle. It is thereby provided that, in the event of a fault, the stator winding of the electric motor of the manual torque adjuster is switched to a passive resistor network, the terminal voltage and/or terminal currents of the manual torque adjuster are measured, and the electromotive force (EMF) of the motor is determined from these measured values. From the EMF it is in turn possible to calculate the angular speed, the integration of which gives the rotation angle. By means of the manual torque adjuster, the steering handle angle or angular speed can accordingly be determined without an additional sensor.

It is known from EP 3 254 932 A1 to tap the steering angle of the steering column upstream and downstream of a torsion bar by means of an angle sensor, in order to distinguish on the basis of these sensor signals between a steering state and a holding state of the steering system.

Like all components of the steering system, the mechanical power transmission between the electric motor of the steering actuator and the steered wheels is also subject to an ageing process, which makes it conceivable and possible that ageing and/or failure phenomena will occur in the power transmission. For example, a toothed belt which effects torque transfer from the electric drive motor to an adjusting actuator for the steered wheels, such as, for example, a spindle drive, can exhibit increased stretching or other wear over time.

While it is possible in conventional motor vehicle power steering systems that such ageing phenomena become noticeable to the attentive driver in a changed steering feel, which is a sign of an imminent failure, there is no possibility at all in steer-by-wire systems for the driver to detect ageing phenomena in the power transmission at an early stage. The two steering systems described above therefore have the disadvantage that changes in the mechanical power transmission cannot be detected, which carries the risk of serious accidents due to a sudden steering failure.

Thus a need exists for a motor vehicle power steering system with improved operational safety.

DETAILED DESCRIPTION

Figure 1:
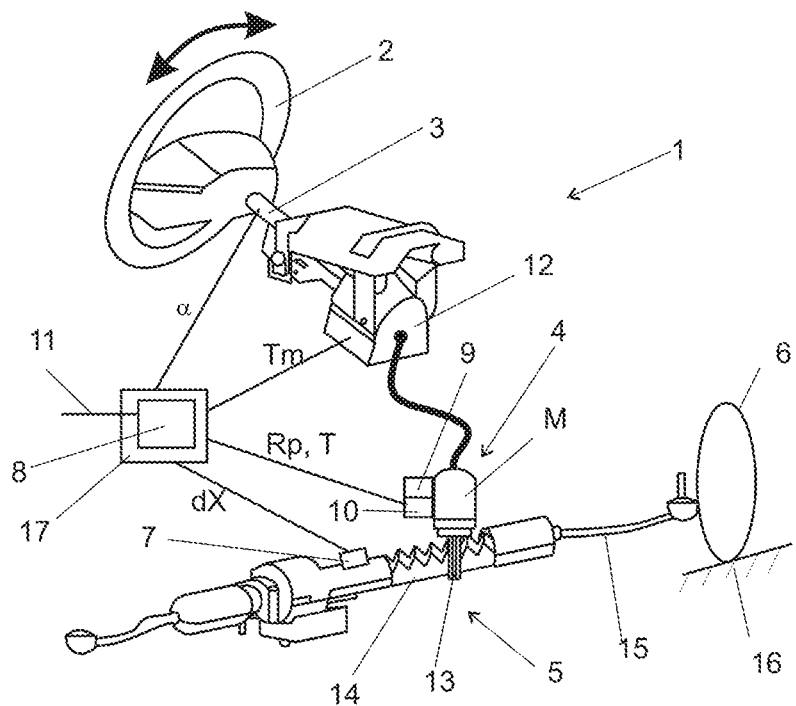
FIG. 1 is a schematic perspective view of an exemplary embodiment of the motor vehicle power steering system.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

There is thereby provided a motor vehicle power steering system which comprises a steering handle having at least one handle sensor for detecting a handle position of the steering handle, an electronically controlled steering actuator having an electric motor for providing an actuating torque in dependence on the detected handle position, a mechanical power transmission for transmitting the actuating torque to steered wheels, and a position sensor for detecting a wheel position of the steered wheels. According to the invention, the motor vehicle power steering system further comprises a monitoring device which is configured to relate the wheel position detected by the position sensor to at least one input parameter of the mechanical power transmission given by the electric motor, in order to monitor the functioning of the mechanical power transmission.

The solution according to the invention provides a motor vehicle power steering system which contains electronic monitoring of the steering mechanism. By comparing input parameters of the mechanical power transmission, such as, for example, the rotor position or the torque of the electric motor, with the adjustment of the steered wheels effected by the mechanical power transmission, the functioning of the mechanical power transmission can be monitored in a simple manner for changes, such as, for example, ageing phenomena. By detecting the wheel position over time, the adjustment of the steered wheels can also be monitored in respect of the achieved adjustment speed and/or the adjustment acceleration.

Detection of the wheel position of the steered wheels can take place directly at the wheels. Alternatively, the wheel position can, however, also be detected indirectly, for example by arranging the position sensor on a rack of the steering system. Preferably, however, at least all the transmission components of the mechanical power transmission are arranged between the electric motor and the position sensor. It is thus ensured that the mechanical components that are most likely to be affected by ageing phenomena are effectively monitored in terms of their functioning.

According to a preferred embodiment, it can be provided that at least one permissible value range for a combination of the detected wheel position, and/or parameters derived therefrom, with the at least one input parameter of the mechanical power transmission, and/or parameters derived therefrom, is stored in the monitoring device, a warning signal being able to be outputted at an output of the monitoring device in the case of a departure from this permissible value range. By storing a permissible value range in the monitoring device, changes in the mechanical power transmission can be evaluated by means of threshold value monitoring. It is also possible to store multiple permissible value ranges, which allow the faults that occur in the power steering system to be classified into different degrees of severity. Preferably, it can be provided that the number of faults that occur is counted and made available to an on-board diagnostic system of the motor vehicle, for example via the warning signal. Depending on the severity of the fault, the driver can also be requested via the warning signal to immediately drive the vehicle to the side of the road and stop or to find a repair shop after a specifiable number of kilometers.

Preferably, the monitoring device can further be configured quantitatively to determine and to monitor at least one mechanical property of the power transmission. Such mechanical properties can be, for example, the stiffness of the power transmission, the free steering play and/or the friction losses in the power transmission A separate value range can be stored in the monitoring device for each monitored mechanical property. It is thus possible to obtain by means of the monitoring device detailed diagnostic information, which facilitates determination of the fault source by a service technician.

According to a preferred embodiment, it is provided that the electric motor is equipped with a rotor position sensor which is connected to the monitoring device in order to detect the rotor position of the electric motor as the input parameter of the mechanical power transmission given by the electric motor. In this manner, the angle of the rotor shaft of the electric motor and the wheel position of the steered wheels are continuously measured and related to one another. Since the two parameters are mechanically coupled with one another via transmission stages, the correspondingly converted angle values correspond to one another in normal operation taking account of the elasticities of the transmission stages. In a particularly preferred embodiment, the motor vehicle power steering system comprises a steering pinion which is driven by the rotor of the electric motor and is brought into engagement with a rack. Rotation of the steering pinion thus leads to a displacement of the rack, and this displacement effects pivoting of the vehicle wheels—that is to say adjustment of the wheel position of the steered wheels. The monitoring device of the motor vehicle power steering system can then be configured to monitor the stiffness of the mechanical power transmission.

When taking account of the rotor position of the electric motor, it must be ensured that there is measured preferably only the electrical position that occupies a multiple of 360 angular degrees, with the factor of the electric poles with which the electric motor is controlled. By conversion and calibration, the mechanical angle position of the rotor of the electric motor, and thus, where present, the mechanical rotation angle position of the steering pinion, can be determined therefrom.

In a further embodiment, the monitoring device can be connected to a torque detection device in order to detect a torque delivered by the electric motor as the input parameter of the mechanical power transmission given by the electric motor. The torque detection device can in particular be in the form of a current measuring device for measuring a motor current consumed by the electric motor. Via the motor current and the speed and voltage values given by the motor controller, the torque delivered by the electric motor can be calculated.

Where rotor position information and the torque delivered by the electric motor are present, the monitoring device can be configured to monitor the free steering play and/or friction losses of the mechanical power transmission. The free steering play can thus be determined, for example, as the maximum possible change in the rotor position at a constant wheel position and without exceeding a specifiable threshold value for the torque. Friction losses can be calculated, for example, by determining the adjustment acceleration of the steered wheels achieved at a specific torque.

The advantages of the motor vehicle power steering system according to the invention are present in particular when the motor vehicle power steering system is in the form of a steer-by-wire steering system. In steer-by-wire steering systems, a failure of the mechanical power transmission not only results in a failure of the power assistance, but a complete loss of the steerability of the vehicle can also occur.

Further embodiments of the invention will become apparent from the following description and the dependent claims.

FIG. 1 shows a first exemplary embodiment of the motor vehicle power steering system 1 according to the invention in a perspective view. In the example shown, the motor vehicle power steering system 1 is in the form of a steer-by-wire steering system, and there is thus no mechanical connection between the steering handle 2, which is in the form of a steering wheel, and the steered wheels 6.

The motor vehicle power steering system 1 comprises a steering wheel as the steering handle 2, having a handle sensor 3 for detecting a handle position α of the steering handle 2. In dependence on the detected handle position α, an electric motor M of an electronically controlled steering actuator 4 provides an actuating torque which is transmitted via a mechanical power transmission 5 to steered wheels 6. A motor control device 17 is provided for controlling the electric motor M in dependence on the handle position α. A steering torque Tm exerted by the driver, which can be received at the steering shaft via a torque sensor, for example, can serve as an additional input parameter for the motor control device 17. In a steer-by-wire steering system, the torque sensor can be integrated into a feedback actuator 12, for example, which transmits feedback of a road 16 to the steering handle 2. The handle sensor 3 can also be integrated into the feedback actuator 12. Furthermore, the feedback, which is transmitted as feedback from the road to the driver, not shown, via the steering handle 2, is determined by a feedback control unit 22. At the same time, the steering torque Tm can also be determined in this control unit, if it is not measured by a separate torque sensor.

The mechanical power transmission 5 from the electric motor M to the steered wheels 6 comprises a steering transmission which, via a steering pinion 13 and a rack 14, converts the actuating torque into a translational force of the rack 14. The rack 14 is connected via tie rods 15 to the steered wheels 6, which are in contact with a road 16. The position of the steered wheels 6 is thus in a mathematically clear relationship with the position of the rack 14. For detecting the wheel position dX of the steered wheels 6, the motor vehicle power steering system 1 therefore has a position sensor 7, which is arranged on the rack 14.

There is further provided in the motor vehicle power steering system 1 a monitoring device 8, which is configured to relate the wheel position dX detected by the position sensor 7 to at least one input parameter T of the mechanical power transmission 5 given by the electric motor M and to the measured rotor position Rp of the rotor of the electric motor, in order to monitor the functioning of the mechanical power transmission 5. In the exemplary embodiment shown, the monitoring device 8 is integrated into the motor control device 17. However, it is also conceivable to form the monitoring device separately from the motor control device 17.

The electric motor M is equipped with a rotor position sensor 9, which is connected to the monitoring device 8. The rotor position sensor 9 serves to detect the electrical rotor position Rp of the electric motor M. Via calibration and detection of the number of electrical rotations of the rotor, the mechanical rotor angle β can be determined therefrom as the absolute angle over multiple mechanical rotations. The mechanical rotor angle β corresponds to the angle of the rotational position of the steering pinion 13. The rotor position sensor 9 can be arranged as a separate sensor on the rotor shaft of the electric motor M or integrated into the electric motor M. Alternatively, it can be provided to design the rotor position sensor 9 directly as an absolute angle sensor which is configured to monitor, in addition to the mechanical angular position of the rotor shaft, the number of rotations of the rotor shaft of the electric motor M over the full steering angle of the steered wheels 6 and thus functions as an absolute angle sensor for the mechanical rotor angle β.

The monitoring device 8 is further connected to a torque detection device 10 for detecting the torque T delivered by the electric motor M as the input parameter of the mechanical power transmission 5 given by the electric motor M. The torque detection device 10 is in the form of a current measuring device for measuring a motor current consumed by the electric motor M.

The monitoring device 8 is equipped with an output 11 via which a warning signal can be outputted if the monitoring device 8 detects a malfunction of the mechanical power transmission 5.

Figure 2:
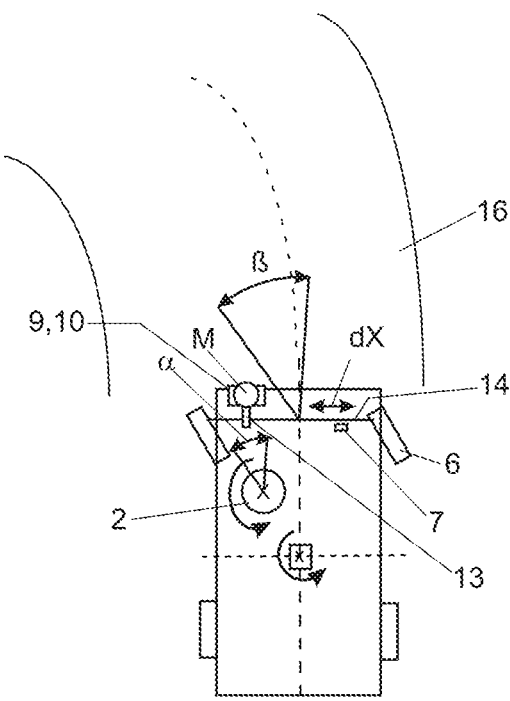
FIG. 2 is a schematic view of a motor vehicle having the motor vehicle power steering system according to FIG. 1.

FIG. 2 shows, schematically, a motor vehicle having the motor vehicle power steering system according to the invention according to the exemplary embodiment of FIG. 1. A steering angle can be set at the steering handle 2 as the handle position α. The electronically controlled steering actuator is controlled via the electric motor M in dependence on the handle position α such that the rack 14 is displaced by a distance dX which corresponds to a wheel position of the steered wheels 6 that is linked to the handle position α. In this manner, the vehicle can be steered along the road 16. In order to check the functioning of the mechanical power transmission between the electric motor M and the steered wheels 6, a position sensor 7 which measures the displacement dX of the rack 14 is provided. A rotor position sensor 9 and a torque detection device 10 are further provided on the electric motor M. The measured data are related to one another in a monitoring device (not shown). The mechanical rotor angle β, which corresponds to the angle of the steering pinion 13, is further shown.

Figure 3:
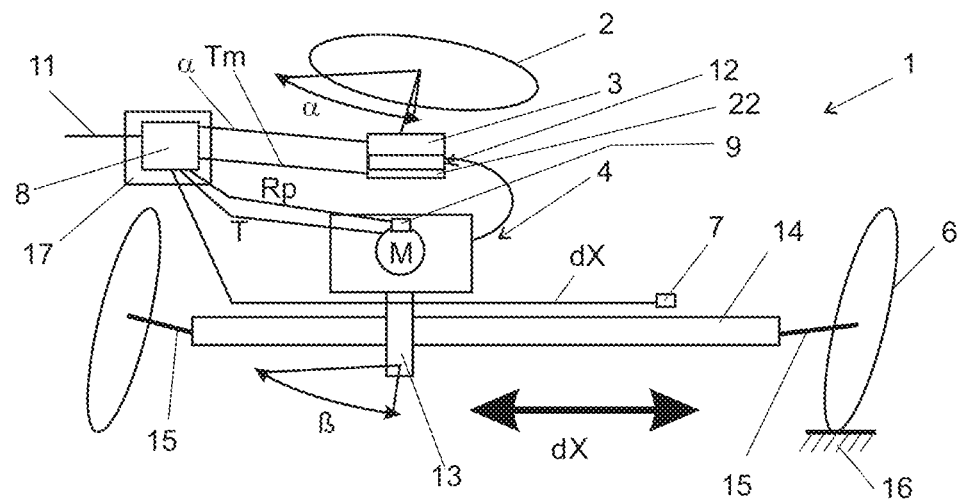
FIG. 3 is a schematic front view of the motor vehicle power steering system according to the exemplary embodiment of FIG. 1.

FIG. 3 shows the vehicle power steering system 1 according to FIG. 1 in a front view.

Figure 4:
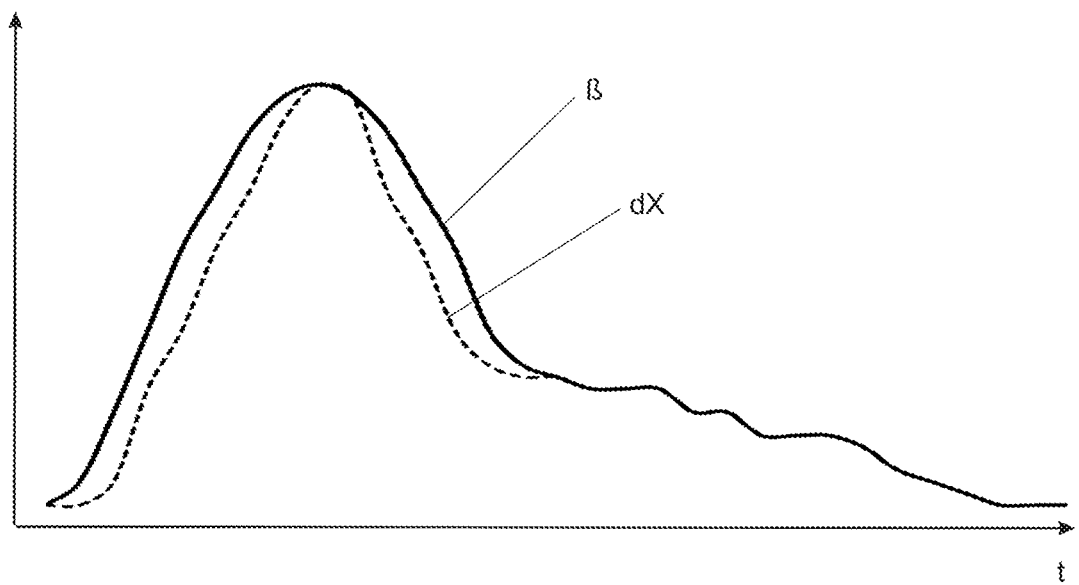
FIG. 4 is a chart showing hysteresis behavior of a motor vehicle power steering system by means of measurement curves of a rotor position and of a rack position over time.

FIG. 4 shows, by way of example, the hysteresis behavior between the movement of the rotor shaft of the electric motor M (mechanical rotor position β) and the movement of the rack, or the wheel position of the steered wheels dX, in a motor vehicle power steering system over time for normal operation. Owing to the limited stiffness of the mechanical power transmission 5 and in particular the free play thereof, the wheel position dX of the steered wheels 6 lags behind the change of the rotor shaft position β. In other words, the required angle for the pivoting of the wheels 6, which corresponds to the mechanical rotor angle β, is not achieved at all. Depending on the movement direction of the steering movement, the set wheel positions dX at the same mechanical rotor angle β can therefore differ within a tolerance range.

Figure 5:
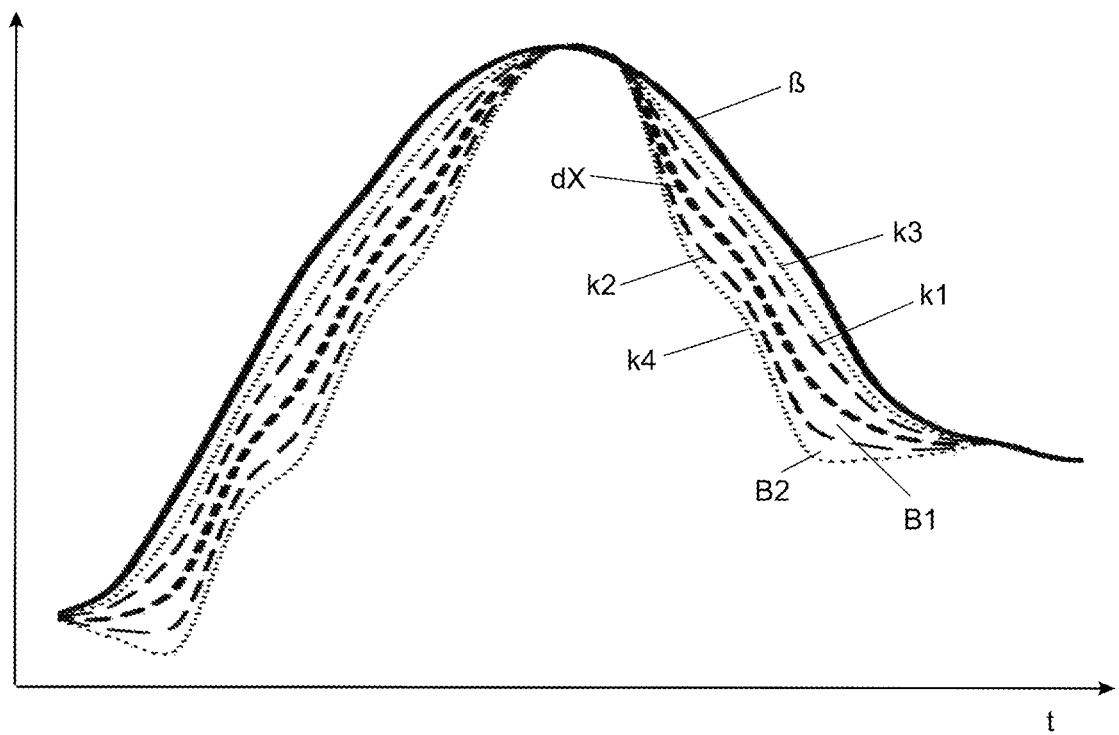
FIG. 5 is a chart of two example permissible value ranges for rack position at a given rotor position over time.

FIG. 5 shows a detail from FIG. 4, in which additional value ranges B1 and B2 are depicted. The value range B1 is limited by the range boundaries k1 and k2 represented by long dashes, and the value range B2 is limited by the range boundaries k3 and k4 represented by dotted lines. The value range B1 represents a permissible value range for the combination of the detected wheel position dX and the detected mechanical rotor angle β which corresponds to normal operation. It is also conceivable and possible to use for the determination of the value range for normal operation also the speed/movement direction Rv of the rotor shaft as the parameter derived from the electrical rotor position Rp or the mechanical rotor angle β.

If the measured wheel position dX departs from the value range B1, this is recognized as a malfunction of the mechanical power transmission 5 and a warning signal can be outputted at the output 11 of the monitoring device 8. The departure from the value range B1 can be classified as a minor malfunction, which does not require the vehicle to be stopped immediately. The driver can, for example, be requested to find a repair shop within a specifiable period of time. It is also conceivable to count the number of minor malfunctions and store it in a fault memory. If the measured wheel position dX departs from the value range B2, this is classified as a serious malfunction and a corresponding warning signal is outputted at the output 11. The driver is requested to stop the vehicle as quickly as possible.

The value ranges B1, B2 are shown in FIG. 5 with a time dependence. This time dependence follows from the variation over time of the mechanical rotor angle β and the speed, derived therefrom, of the rotor shaft Rv. However, the value ranges B1, B2 shown are preferably stored in the monitoring device 8 in the form of time-independent sub-regions of a multidimensional parameter space. According to the example shown, the value ranges B1, B2 can be defined as sub-regions of the three-dimensional parameter space (β, Rv, dX). By means of a parameter combination (β, Rv, dX) determined by the sensors, it is then possible to determine, by interrogation, whether this combination lies within the respective predefined value range B1, B2.

By suitably combining different measurable parameters in the mechanical power transmission, individual mechanical properties of the power transmission 5 can be quantitatively determined and monitored. In particular, a separate value range can be stored in the monitoring device 8 for monitoring each individual mechanical property of the power transmission. The difference in the wheel positions dX at the same rotor angle β and different directions of rotation of the rotor shaft can serve, for example, as a measure of the stiffness of the mechanical power transmission. The free steering play can be determined from the maximum possible difference of the rotor angle β at the same wheel position dX without exceeding a threshold value for the torque applied by the electric motor. Friction losses of the mechanical power transmission can be recognized on the basis of an increased torque requirement of the electric motor M to achieve a given adjustment speed.

Figure 6:
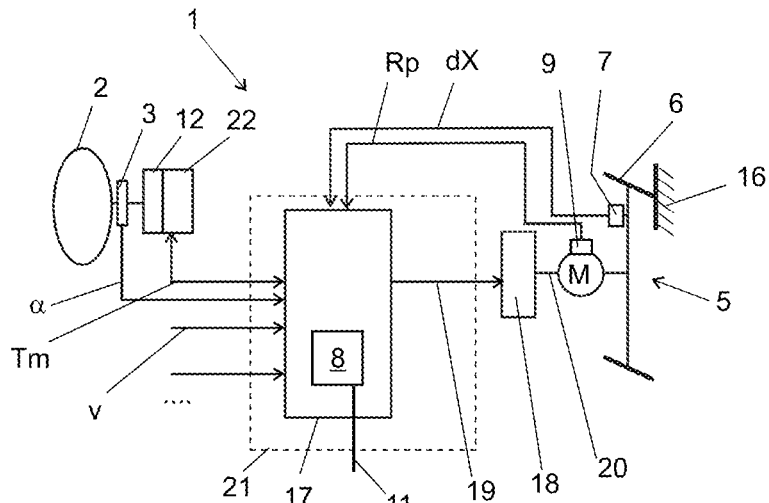
FIG. 6 is a schematic view of an example configuration of a motor vehicle power steering system.
Figure 7:
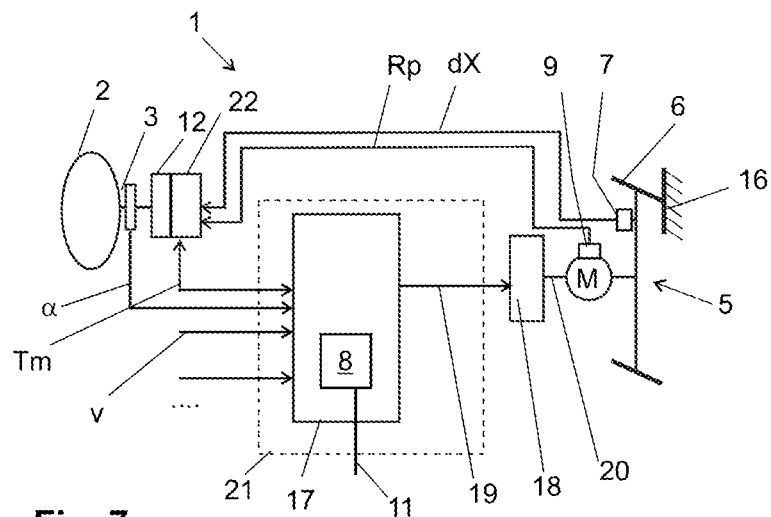
FIG. 7 is a schematic view of another example configuration of a motor vehicle power steering system.
Figure 8:
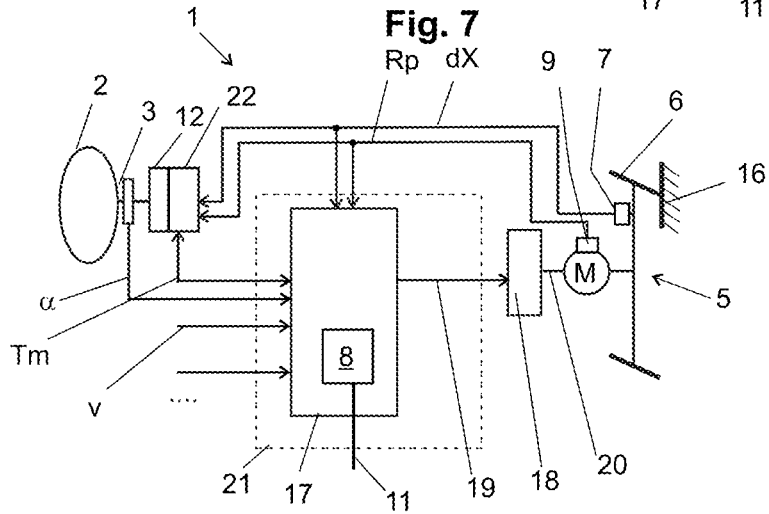
FIG. 8 is a schematic view of still another example configuration of a motor vehicle power steering system.

FIGS. 6 to 8 show three further exemplary embodiments of the motor vehicle power steering system 1 according to the invention. The exemplary embodiments differ from the first exemplary embodiment shown in FIG. 1 substantially in that no torque detection device is provided. The provision of a torque detection device is, however, also conceivable in the exemplary embodiments according to FIGS. 6 to 8.

According to the examples shown, however, only the electrical rotor position Rp is measured in real terms. The required mechanical rotor angle β is determined therefrom in a control device and fed to the monitoring device 8.

The exemplary embodiments of FIGS. 6 to 8 differ from one another by their structural configuration for processing the sensor signals of the position sensor for detecting the wheel position and the rotor position sensor 9 of the electric motor M.

In the exemplary embodiment according to FIG. 6, all the sensor signals are fed directly to a central steering controller 21. The steering controller 21 comprises the motor controller 17, which in turn contains the monitoring device 8. A handle position α inputted at the steering handle 2 is detected by a handle sensor 3 and fed to the motor controller 17. Via a feedback actuator 12, a steering torque Tm is received and fed to the motor controller 17. The motor controller 17 further receives the vehicle speed v as an input parameter. It is conceivable to provide even further input parameters for the motor controller 17. The sensor signals dX, Rp of the rotor position sensor 9 and of the position sensor 7 arranged on the rack are additionally fed to the motor controller 17. From there, the wheel position dX and the rotor position Rp are also transmitted to the feedback actuator 12 for imparting feedback from the road 16 to the steering handle 2.

The motor controller 17 generates a control signal 19 which corresponds to the driver's steering intention and is fed to a driver circuit 18 of the electric motor M, which connects the motor currents to motor terminals 20.

The monitoring device 8 evaluates the wheel position dX and the rotor position Rp, or the mechanical rotor angle β already determined in the steering controller 21 from the rotor position, and relates them to one another. In the case of a departure from a permissible value range, a warning signal can be outputted at the output 11 of the monitoring device 8.

The exemplary embodiment according to FIG. 7 differs from FIG. 6 in that there is a direct feedback of the wheel position dX and of the rotor position Rp into the feedback actuator 12, in particular into the feedback control unit 22 thereof, from which the measured values dX, Rp together with the steering torque Tm imparted to the steering handle 2 are then transmitted to the central steering controller 21.

In FIG. 8, in contrast to FIGS. 6 and 7, the wheel position dX and the rotor position Rp are fed back both into the feedback actuator 12 and into the motor controller 17. An exchange of the wheel position dX and the rotor position Rp between the feedback actuator 12 and the steering controller 21 can thus be omitted.

Otherwise, the observations made in relation to the exemplary embodiment shown in FIG. 1 apply correspondingly to the exemplary embodiments according to FIGS. 6 to 8.

LIST OF REFERENCE SIGNS 1 motor vehicle power steering system
2 steering handle
3 handle sensor
4 steering actuator
5 power transmission
6 steered wheel
7 position sensor
8 monitoring device
9 rotor position sensor
10 torque determination device
11 output
12 feedback actuator
13 steering pinion
14 rack
15 tie rod
16 road
17 motor control device
18 driver circuit
19 control signal
20 motor terminals
21 steering controller
22 feedback control unit
□ handle position
β mechanical rotor angle
Tm steering torque
T torque
v vehicle speed
Rp rotor position
Rv speed of the rotor shaft
dX rack position
B1, B2 value range
k1 to k4 range boundaries

What is claimed is:

1. A motor vehicle power steering system comprising:
 a steering handle having a handle sensor for detecting a handle position of the steering handle;
 an electronically controlled steering actuator having an electric motor for providing an actuating torque based on the handle position that is detected;

a mechanical power transmission for transmitting the actuating torque to steered wheels;
a position sensor for detecting a wheel position of the steered wheels; and
a monitoring device that is configured to relate the wheel position detected by the position sensor to an input parameter of the mechanical power transmission given by the electric motor to monitor functioning of the mechanical power transmission;
wherein the electric motor is equipped with a rotor position sensor that is connected to the monitoring device to detect a rotor position of the electric motor as the input parameter of the mechanical power transmission given by the electric motor;
wherein the monitoring device is configured to monitor a stiffness of the mechanical power transmission.

2. The motor vehicle power steering system of claim 1 wherein the monitoring device is configured to store a permissible value range for a combination of the detected wheel position and/or parameters derived therefrom with an input parameter of the mechanical power transmission and/or parameters derived therefrom, wherein the monitoring device is configured to output a warning signal from an output of the monitoring device upon a departure from the permissible value range.

3. The motor vehicle power steering system of claim 1 wherein the monitoring device is configured quantitatively to determine and to monitor a mechanical property of the mechanical power transmission.

4. The motor vehicle power steering system of claim 1 wherein the monitoring device is configured quantitatively to determine and to monitor mechanical properties of the mechanical power transmission, wherein the monitoring device is configured to store a separate permissible value range for each of the mechanical properties that is monitored.

5. The motor vehicle power steering system of claim 1 wherein the monitoring device is configured to monitor at least one of free steering play or friction losses of the mechanical power transmission.

6. The motor vehicle power steering system of claim 1 wherein the monitoring device is connected to a torque detection device to detect a torque delivered by the electric motor as the input parameter of the mechanical power transmission given by the electric motor.

7. The motor vehicle power steering system of claim 6 wherein the torque detection device is a current measuring device for measuring a motor current consumed by the electric motor.

8. The motor vehicle power steering system of claim 6 wherein the monitoring device is configured to monitor at least one of free steering play or friction losses of the mechanical power transmission.

9. The motor vehicle power steering system of claim 1 configured as a steer-by-wire steering system.

10. A motor vehicle power steering system comprising:
a steering handle having a handle sensor for detecting a handle position of the steering handle;
an electronically controlled steering actuator having an electric motor for providing an actuating torque based on the handle position that is detected;
a mechanical power transmission for transmitting the actuating torque to steered wheels;
a position sensor for detecting a wheel position of the steered wheels; and
a monitoring device that is configured to relate the wheel position detected by the position sensor to an input parameter of the mechanical power transmission given by the electric motor to monitor functioning of the mechanical power transmission;
wherein the electric motor is equipped with a rotor position sensor that is connected to the monitoring device to detect a rotor position of the electric motor as the input parameter of the mechanical power transmission given by the electric motor;
wherein the monitoring device is configured to monitor at least one of free steering play or friction losses of the mechanical power transmission.

11. The motor vehicle power steering system of claim 10 wherein the monitoring device is connected to a torque detection device to detect a torque delivered by the electric motor as the input parameter of the mechanical power transmission given by the electric motor.

12. The motor vehicle power steering system of claim 10 wherein the torque detection device is a current measuring device for measuring a motor current consumed by the electric motor.

13. The motor vehicle power steering system of claim 10 configured as a steer-by-wire steering system.

14. A motor vehicle power steering system comprising:
a steering handle having a handle sensor for detecting a handle position of the steering handle;
an electronically controlled steering actuator having an electric motor for providing an actuating torque based on the handle position that is detected;
a mechanical power transmission for transmitting the actuating torque to steered wheels;
a position sensor for detecting a wheel position of the steered wheels; and
a monitoring device that is configured to relate the wheel position detected by the position sensor to an input parameter of the mechanical power transmission given by the electric motor to monitor functioning of the mechanical power transmission;
wherein the monitoring device is connected to a torque detection device to detect a torque delivered by the electric motor as the input parameter of the mechanical power transmission given by the electric motor.

15. The motor vehicle power steering system of claim 14 wherein the torque detection device is a current measuring device for measuring a motor current consumed by the electric motor.

16. The motor vehicle power steering system of claim 14 configured as a steer-by-wire steering system.

* * * * *